INVENTORS
JOSEPH U. MESSENGER
WILLIAM W. WEBSTER

Emil J. Bednar

ATTORNEY

United States Patent Office 3,454,095
Patented July 8, 1969

3,454,095
OIL RECOVERY METHOD USING STEAM STIMULATION OF SUBTERRANEAN FORMATION
Joseph U. Messenger, Dallas, and William W. Webster, Arlington, Tex., assignors to Mobil Oil Corporation, a corporation of New York
Filed Jan. 8, 1968, Ser. No. 696,374
Int. Cl. E21b *43/24*
U.S. Cl. 166—303           14 Claims

ABSTRACT OF THE DISCLOSURE

This specification discloses:
A method for recovering oil from an oil-bearing subterranean formation which contains fresh-water swelling clay materials and an oil which forms water-in-oil emulsions in the presence of steam. A single-phase solution is injected into the formation from suitable well means. This solution consists of an oil and water miscible organic liquid and a surfactant constituent, either a cationic surfactant of the quaternary amine type, a nonionic surfactant of the water-soluble type, or preferably a mixture of both types of surfactants. Steam is injected into the formation which received the solution until the formation is sufficiently heated to reduce the viscosity of the in-place oil. Thereafter, the heat-thinned oil is recovered. Specific examples of many usable organic liquids and surfactants are given.

BACKGROUND OF THE INVENTION

Field of the invention

This invention relates to the recovery of oil from a subterranean formation. More particularly, it relates to a method which employs the injection of steam into the formation to promote an increased recovery of oil therefrom.

Description of the prior art

There are many oil-bearing subterranean formations from which the resident oil cannot be recovered in economic quantities by primary recovery techniques. In these formations, secondary recovery techniques must be employed if the oil is to be recovered in economic quantities. One of the secondary recovery techniques which has been found well suited for use in these formations is known generally as "steam stimulation." In this technique, steam is injected from a well into the formation for a period of time until the formation is heated sufficiently that the viscosity of the oil contained therein is lowered to a degree that it may be readily produced. A clean-up of the formation about a common steam injection, oil production well also fosters increased oil productivity. Then, the heat-thinned oil is recovered from the formation through either this well or an adjacent well. The steam stimulation technique has provided substantial increases in the quantities of oil recovered from subterranean formations. However, certain formations have also provided substantial accompanying problems that have limited the ultimate usefulness of the steam stimulation technique.

Certain formations contain hydratable clay materials. A hydratable clay material may be classified as one which swells upon being wetted with fresh water. It will be apparent that the swelling of clay materials in the formation, especially within the first few feet about a well, severely restricts the formation's permeability to various fluids, and particularly, to wet steam. For example, injection of wet steam into such formation causes the immediate hydration of the clay materials by contact with water condensed from the steam, or carried with it, adjacent the steam injection well.

It has been proposed to add various inorganic salts to the first injected steam to avoid the problem of swelling of these clay materials in the formation. However, the introduction of highly concentrated salt solutions into a formation leads to problems with the produced fluids. For example, the produced fluids can remove substantial portions of these salt solutions from the treated formation and carry them to the earth's surface. These salt solutions must be removed from the produced fluids to prepare an oil of sufficient purity for sales purposes.

It has been proposed also to treat the formation immediately about the well with various surfactants to improve the steam stimulation techniques. These surfactants are carried out into the formation with the injected steam and therein mingled with the oil desired to be recovered. Then, the oil produced from the formation carries with it these surfactants. Therefore, an indiscriminate selection of the surfactant can cause serious emulsion problems in the formation and in surface oil-water separating equipment. Not only can certain surfactants cause a stabilization of the resulting emulsion, but in some cases they can convert the usual water-in-oil emulsion to the oil-in-water form which is greatly more difficult to separate. Thus, the surfactants may solve one problem in steam stimulation, but ultimately cause a more serious problem in separating the oil from the produced fluid.

Another problem of the steam stimulation techniques resides in the nature of the crude oil desired to be recovered. Certain crude oils contain many natural emulsifying agents. These agents combine with water present in the formation under the influence of the injected steam to generate water-in-oil emulsions. The emulsifying agents present in these crude oils include: asphaltenes, resins, heavy paraffinic, naphthenic, and porphyrn-metal compounds; finely dispersed solids, clays, silts, and scale; and corrosion products. These agents are large-sized molecules with oil and water soluble portions which cause emulsification of the crude oil and water. These agents locate at the interface between the oil and water with the nonpolar portion of the molecule extending into the oil and the polar portion extending into the water. The solids, which act as emulsifying agents, stabilize the emulsion by their being in a wet condition to one phase when suspended in the other nonwetted phase. Whatever the nature of the solids, they tend to form highly stable emulsions of water and oil. Thus, it will be seen that the in-place crude oil contains many natural materials which can cause severe water-in-oil emulsion problems whenever a proper environment for their formation is present.

The environment for forming a crude oil and water emulsion, where an emulsifying agent is present, requires in any physical condition only sufficient energy to disperse one liquid in the other liquid. The more energy that is available, the smaller the droplet size of the dispersed phase in the continuous phase of the emulsion. The dispersed phase may have a droplet diameter less than 25 microns. Under these conditions, the area of the interfacial film between the oil and water phases in a stable emulsion is substantial. The interfacial area of one gallon of the dispersed phase which is dispersed in the continuous phase in a stable emulsion would range from about 1,000 to 300,000 square feet, depending upon the particular diameters of the dispersed droplets in the continuous phase. Since the emulsifying agents congregate at this interfacial area, very stable emulsions can be formed by only small amounts of these agents.

The energy for creating the emulsion is provided by the steam being injected into the formation. It has been observed that emulsion problems have always increased in severity following the application of steam. However, the ultimate stability of the emulsion rests upon the chemical properties of the crude oil and water. The injection of steam into a formation causes the creation of minute droplets of fresh water, by condensation, in openings of the formation. The emulsifying agents in the crude oil stabilize the dispersion of these droplets. Additionally, solids which are free to move in the formation are dispersed in the crude oil by their reaction with the fresh water to stabilize more intensely the emulsion. The steam also distills light ends from the crude oil which leaves a heavier residue of increased activity as emulsifying agents. Thus, the crude oil and water cause a great stability in the resulting emulsions. Naturally, the highly viscous emulsions increase the production of formation solids with the produced fluids from the formation. These formation solids also tend to be concentrated in the produced fluids. Thus, these solids give rise to increased emulsion stability. Lastly, the injected steam usually causes a turbulent flow of fluids in the formation. Turbulent flow conditions enhance the dispersion of the droplets from one phase in the other phase to the ultimate degree required for providing the emulsion.

The steam injected into a formation containing freshwater swellable clay materials causes a swelling of these materials. This swelling effect restricts the permeability to fluids in the formation adjacent the wellbore. The steam must then pass through this zone of the formation at increased velocities and thereby increase turbulent flow conditions. This action further tends to disperse the water in the crude oil to produce a stable emulsion. The fluids produced from the formation into the same well again must pass through the restricted permeability zone and thereby undergo further highly turbulent flow. This turbulent flow will disperse the dispersed water even more fully in the crude oil to provide increased stability in the existing emulsion. Thus, the problems with injecting steam into a formation to produce crude oil from it are basically founded upon fluid injectivity and resulting emulsions. These problems are not separate but contingent to a large degree upon each other.

Additionally, problems exist at the earth's surface in separating the emulsion in the produced fluids into separate water and crude oil phases so that the crude oil may be sold or passed into a pipeline. Once an emulsion is allowed to age, or to cool below the temperature of the formation, its stability is further increased. Thus, any correction of the emulsion problem that can be obtained within the formation will greatly simplify the problems of separating the emulsion into its constituent phases at the earth's surface.

Processes for successfully breaking a crude oil and water emulsion require the performance of certain functions. The stability of the interfacial film surrounding the dispersed phase must be broken, or greatly weakened, and then, the droplets which result are coalesced into a continuous phase. Lastly, the coalesced phase is separated from the other phase. These functions may be one or more of the following: chemical treatments with demulsifying surfactants, the application of heat, electrical methods, and centrifuging to increase the effects of gravitational acceleration on the dispersed phase and droplets. Usually, a combination of these functions is employed to separate the very stable crude oil and water emulsions which are produced in the steam stimulation of a subterranean oil-bearing formation.

Demulsifiers are surfactants which break, or weaken, the interfacial films surrounding the dispersed droplets of water in the continuous oil phase. The demulsifiers are added to counter the effect of the emulsifiers which are present within the crude oil. Naturally, the demulsifiers must be distributed uniformly throughout the produced fluids so as to be present at all the interfaces of the emulsion before a separation of phases can be obtained. Surfactants, which are also known as surface-active agents, may be of several types to serve as demulsifiers for crude oil and water emulsions. These surfactants are classified as cationic, anionic, or nonionic types depending upon the existence, and nature, of ionizable groups in the molecule. Whatever the type, the surfactant may be considered as being formed of two parts. One part is made up of one group that is oil soluble and virtually water insoluble. The other part is formed of another group that is strongly water soluble and oil insoluble. Thus, a proper balance of the two groups may provide the desired type of surfactant. These groups also determine whether the surfactant is oil soluble or water soluble.

The choice of the type of surfactant to be used in surface facilities for breaking crude oil and water emulsions is greatly simplified since very few of the emulsion-forming conditions are present which exist within a subterranean formation. For example, the cationic and anionic surfactants, when introduced into a subterranean formation, quickly lose their surface-active properties by their absorption onto the reaction centers provided the formation's solid particles, especially the clay materials that are normally present.

In surface facilities, only one type of surfactant is usually employed since a mixture of surfactant types generally is not necessary. The mixing of the cationic and anionic surfactants is not recommended since reactions can occur between them to produce enhanced emulsion stability rather than a breaking of the emulsion.

The nonselective introduction of surfactants into a formation can lead to serious emulsion problems. For example, the cationic and oil-soluble nonionic surfactants tend to form water-in-oil emulsions. The anionic and water-soluble nonionics tend to form oil-in-water emulsions. Thus, indiscriminate use and mixing of surfactant types can cause emulsion problems even worse than would occur without their use. It is therefore apparent that the selection of surfactants for use in subsurface formations with steam stimulation techniques is not a simple process.

SUMMARY OF THE INVENTION

In accordance with this invention, there is provided a method for recovering oil from an oil-bearing formation containing fresh-water swelling clay materials, and an oil which forms water-in-oil emulsions in the presence of steam. The formation is penetrated by well means adapted for conveying fluids between the earth's surface and the formation. A single-phase solution is injected into the formation. This solution consists of an organic liquid having a mutual solubility for oil and water, and a cationic surfactant of the quaternary amine type. Steam is injected into the formation receiving the solution until the formation adjacent the well means is heated sufficiently to reduce the viscosity of the oil contained therein. The oil of reduced viscosity is recovered from the formation through the well means.

DESCRIPTION OF SPECIFIC EMBODIMENTS

Figure 1:
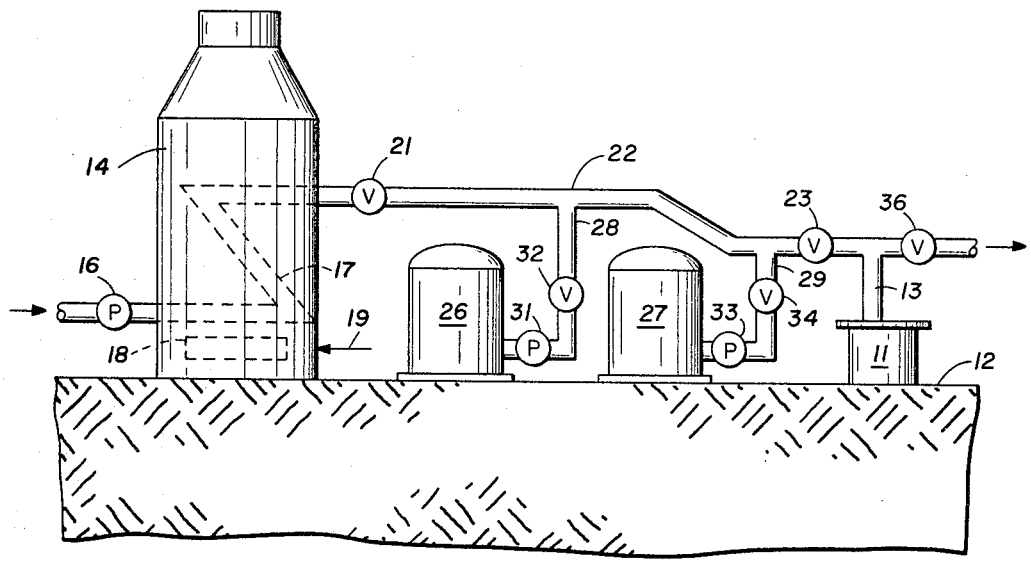
FIGURE 1 is a schematic illustration, in elevation of suitable structures for carrying out the method of the present invention.

Referring to FIGURE 1, there are shown suitable structures by which the present method may be practiced. These structures include a well 11 which extends downwardly from the earth's surface 12 into fluid communication with a subterranean oil-bearing formation. The part of the well 11 which penetrates into the formation will be described in greater detail hereinafter relative to FIGURE 2. The well 11 is provided with a tubing 13 by which fluids may be conveyed between the earth's surface 12 and the formation. Steam is passed into the tubing 13 for the steam stimulation of the formation. Any source for such steam may be used. Usually, the source of steam is a steam generator 14 connected to a source of feedwater. The feedwater is moved by a pump 16 to pass through an internal coil 17 in the steam generator 14. The feedwater is converted to high pressure steam in the coil 17 as a result of being heated by a burner 18 operated from gas supply 19. The high pressure steam from the steam generator 14 passes through a control valve 21 into a manifold line 22. Then, the steam flows through a wellhead valve 23 and into the tubing 13. The steam forced into the tubing 13 passes downwardly into the well 11 and then flows into the formation from which oil is desired to be produced.

For purposes of this invention, a conduit system is provided to add certain additives to the flow stream introduced into the well 11. These additives may be introduced ahead of, or into, the steam, or even into the feedwater moved by the pump 16 into the steam generator 14. However, it is preferred to add these additives directly to the steam carried in the manifold line 22. More particularly, feed tanks 26 and 27 connect through the conduits 28 and 29 to the manifold line 22. The fluid contents of the feed tank 26 are moved through the conduit 28 by pump 31 and the flow rate is regulated by the valve 32. The fluid contents of feed tank 27 are moved through the conduit 29 by pump 33 and the flow rate is regulated by valve 34. If desired, the wellhead valve 23, and valves 32 and 34, may be check valves to limit fluid flows through the manifold line 22 toward the well 11.

After the injection of steam and additives into the well 11 has been accomplished, the wellhead valve 23 is closed. The flow of steam from the steam generator 14 through the manifold line 22 to the well 11 is terminated. After this time, wellhead valve 36 is opened. As a result, fluids from the formation are produced upwardly through the tubing 13 from the well 11. These produced fluids are sent to any suitable surface facility (not shown) where the recovered oil may be stored or processed. Many conventional forms of these surface facilities are known and any of them may be used.

The above-described flow of steam from the tubing 13 into the formation produces a sufficient heating of the formation about the well 11 until viscosity of the in-place oil is reduced. At this time, the injection of steam into the formation is interrupted. Thereafter, the heat-thinned oil is recovered from the formation through the tubing 13 of the well 11. This steam stimulation technique to promote the recovery of oil from a subsurface formation is well known as "steam-soaking" or steam "push-pull" procedure.

It is preferred for operational convenience to use the same well for the introduction of steam into and production of fluids from the formation. However, in some situations, separate wells may be used for steam injection and for fluid production in a steam flooding of the formation. Under these circumstances, steam is passed through the formation to reduce the viscosity of the in-place oil and flow the heat-thinned oil into the production well at some distance from the steam injection well. These steam stimulation techniques are so closely related to each other in function and result that they share common problems relating to the injection of steam and creations of emulsions. Therefore, the present method is of good utility and great advantage when used in any of the steam stimulation techniques.

Figure 2:
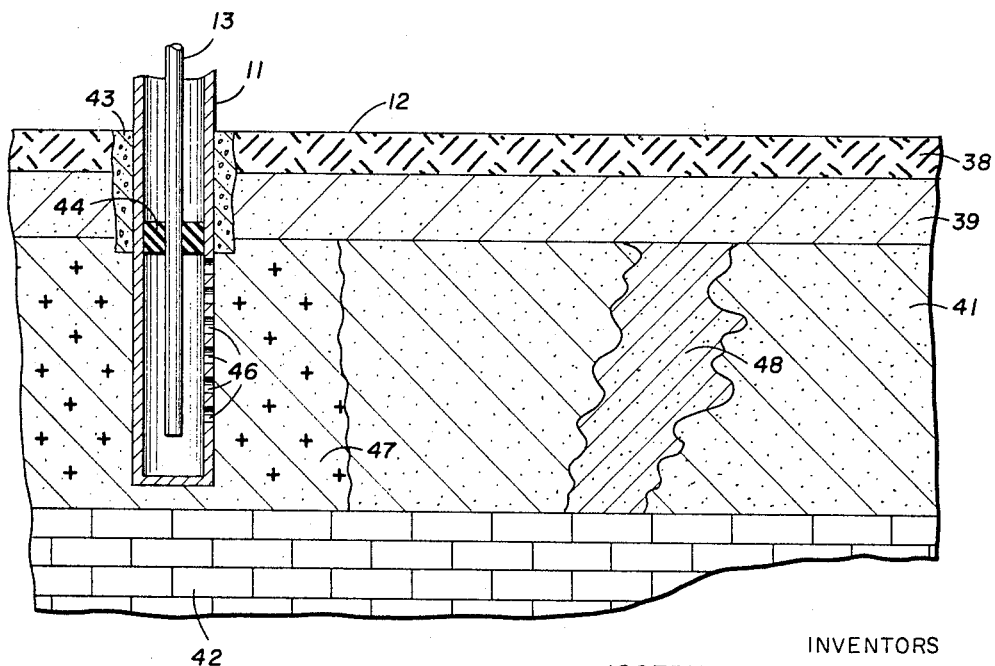
FIGURE 2 is a fragmentary vertical section taken through the lower-right portion of the formation and the well shown in FIGURE 1, which section illustrates the results of practicing certain steps of the present method.

Referring now to FIGURE 2, the well 11 is shown extending downwardly through the earth's surface 12, an overburden 38, and a stratum 39 barren of oil into an oil-bearing formation 41. The formation 41 rests upon an impermeable formation 42. The well 11 is sealed by a cement sheath 43 to the overburden 38 and stratum 39. A packer 44 mounted about the tubing 13 fluidly isolates the well 11 adjacent the top of the formation 41. Perforations 46 below the packer 44 in the well 11 provide fluid communication between the tubing 13 and the formation 41. Thus, fluids can be passed between the earth's surface 12 and the formation 41.

The formation 41 usually contains clay materials such as chlorite, koalinite, illite, montmorillonite, and muscovite that swell, or that are dispersed, when exposed to fresh water. A swelling of these clay materials obviously seals the pores and flow channels which provide the natural permeability to fluids in the formation 41. Therefore, any fresh water passed from the well 11 into the formation 41 causes these clay materials to swell and thereby greatly reduce the ability of the formation 41 to conduct fluid flows therethrough under a fixed set of flow conditions. It is generally considered that the reduction of fluid permeability, by these swollen clay materials undergoing such hydration, is especially critical within a radius of 5 feet of the well 11.

In addition to these clay materials, the formation 41 usually contains a crude oil which, because of its composition and environment, produces severe water-oil emulsions when steam and fresh water are passed into the formation 41. Such emulsions become especially severe where high turbulent flows are encountered adjacent the well 11. Obviously, this turbulence is obtained when the clay materials swell sufficiently to close off a substantial portion of the pores and channels of the formation through which fluids must flow between the well 11 and the formation 41.

The present method avoids these problems encountered in steam stimulation techniques in the following manner. A single-phase solution, preferably as a slug, is injected into the formation 41 from the well 11. Usually, this step should be practiced before any substantial injection of steam into the formation 41 has occurred for best results. This solution consists essentially of an organic liquid having mutual solubility for oil and water, and a cationic surfactant of the quaternary amine type, a water-soluble nonionic surfactant, or preferably a mixture of both surfactants. The solution should contain no substantial quantities of substances other than the organic liquid and surfactants herein mentioned, which substances cause interference to the proper functioning of these essential constituents.

The organic liquid provides a particular environment in which the cationic surfactant can function. More particularly, the organic liquid can dissolve the oil within the formation 41. It also can dissolve the water therein, which is usually present only in small amounts as connate water. Thus, the organic liquid tends to produce a single liquid phase in the formation 41. This phase consists of a solution of organic liquid, oil and water, and may be considered to form a transition zone 48 within the formtaion 41 immediately about the well 11. The transition zone 48 has a leading edge which may be advanced into the formation 41 by the subsequent injection of a driving fluid. By this operation, the oil on the exposed surfaces of the formation's matrix, also within its pore channels, can be either displaced or dissolved by the organic liquid as the transition zone 48 moves away from the well 11. Thus, water and oil, especially the heavier constituents therein which form emulsifying agents, are moved, at least in part, into the formation 41 away from the well 11. Thus, two problem materials are removed from the formation 41 adjacent the well 11. These materials are preferably displaced away from the critical area in the formation 41 a distance of about 5 feet from the well 11. Furthermore, the formation 41 in this critical area about the well 11 has been converted by the organic liquid into a state where it may be rendered more readily oil-wet by the cationic surfactant.

Some of the clay materials, upon being wetted with water, become hydrated. As a result of this hydration, the clay materials swell. The hydrogen ion and polyvalent cation forms of the clay materials swell less than the sodium cation form. Also, the clay materials have active centers between their platelets on which ion exchange capabilities exist. Therefore, a higher concentration of an exchangeable ion will replace an existing ion on the clay materials. For example, the calcium salt of the clay materials is converted to the sodium salt form by application of an excess of sodium ions above the calcium ions. Other of the clay materials are dispersed in water because of the same ion exchange capabilities. In the present method, the clay materials are converted into a salt form with a nonreplaceable cation wherein their hydration, or dispersion, is reduced to a minimum for practical purposes.

The amine ion of this cationic surfactant undergoes a total ion exchange with whatever ions reside at the active centers of the clay materials. The amine ion of this surfactant is a very strongly basic ion. Therefore, the amine ion exchange into the clay materials forms a very stable substance, the quaternary ammonium salt of the clay material. No ions, in solution or otherwise, are present in the formation 41 which are capable of reversing this total amine ion exchange function that has occurred. Only very strong replaceable ions in special solutions introduced through the well 11 could again convert the quaternary ammonium salt form of the clay materials into a water-swelling condition. Thus, the exchange of the amine ion into the clay material is nonreversible for practical purposes.

In most instances, it is most desirable to include with, or admix in, the above described solution of the organic liquid and cationic surfactant, a water-soluble nonionic surfactant. Nonionic surfactants tend to form oil-in-water emulsions. Thus, the nonionic surfactants are well suited for resolving the water-in-oil emulsions which are created during injection of steam into the formation 41. These surfactants may be included within the solution during its injection as a slug into the formation before substantial amounts of steam are injected into the formation 41. However, these surfactants may also be introduced directly with the steam after the introduction of the slug of the solution into the formation 41. Various types of nonionic surfactants which are water soluble may be employed in the use of this invention.

The solution of the organic liquid and cationic surfactant may be stored in the feed tank 26. A suitable volume of the solution, to form the slug, is removed from the tank 26 by means of pump 31 and passed in conduit 28 through the valve 32, the manifold line 22, and into the tubing 13. The slug of the solution flows through the tubing 13 and out of the perforations 46 into the formation 41 surrounding the well 11. After the slug of solution is introduced into the formation 41, the pump 31 is shut down and valve 32 closed to prevent further fluid flow through the conduit 28.

At this time, steam from the steam generator 14 is passed through the control valves 21, the manifold line 22, and wellhead valve 23, and enters the tubing 13. The steam flows from the tubing 13 out of the perforations 46 into the formation 41. The steam readily flows through the portion of the formation 41 which received the solution. This portion is indicated as treated area 47 of the formation 41. The quaternary ammonium salts of the clay material in the treated area 47 cannot expand or swell due to the hydrating action of water condensed from, or carried by, the steam.

The water-soluble nonionic surfactant may be contained in the feed tank 27. When it is desired to inject this surfactant into the well 11, the pump 33 is actuated and valve 34 is opened to permit fluid flow through the conduit 29 into the manifold line 22, through the wellhead valve 23 and into the tubing 13. Thus, the nonionic surfactant may be commingled with the steam which enters the formation 41 introducing the slug of solution containing the organic liquid and cationic surfactant.

If desired, the nonionic surfactant may be prepared in a solution with the organic liquid in the same manner as the cationic surfactant previously mentioned. The resultant solution is miscible with oil and water. In this form, either solution is usable in the formation 41 without liquid blocks or oil-banking problems.

However, in a preferred form of the present method, the solution consists essentially of an organic liquid having a mutual solubility for oil and water, the cationic surfactant of the quaternary amine type, and the water-soluble nonionic surfactant. Thus, the solution is employed as a slug prior to the substantial injection of steam into the formation 41. The nonionic surfactant does not interfere with the previously described action of the cationic surfactant in forming the amine forms of the clay materials surrounding the well 11. However, the nonionic surfactant is carried out into the formation upon the subsequent injection of steam to resolve water-in-oil emulsions. The nonionic surfactant will generally be dispersed throughout the formation even beyond the area where the transition zone 48 is finally dissipated. It will be appreciated that the cationic surfactant remains in the treated area 47 closely adjacent the well 11 in a combined form with the clay materials.

In some instances, the surfactants may not form single-phase solutions with the desired rapidity or clarity because of the presence of solvents, carriers, and the like, introduced during their manufacture, or for other reasons. Under these circumstances, an oil solvent, such as carbon disulfide, may be added in a small amount to produce the desired single-phase solution. These small amounts of the solvent will not interfere in the proper functioning of the solution. Thus, the solution functionally consists essentially of the mentioned components even with the solvent being present.

As earlier described, the flow of steam is continued until the formation 41 about the well 11 is heated sufficiently to reduce the viscosity of the oil which is contained therein. After the desired heating is obtained in the formation 41, the steam generator 14 is shut down. Also, control valve 21 and wellhead valve 23 are closed. At this time, the wellhead valve 36 is opened and fluids are produced from the formation 41 through the tubing 13. These produced fluids pass through the wellhead valve 36 to a surface facility where the recovered oil may be stored or utilized. In this manner, the heat-thinned oil is recovered from the heated formation through the well 11.

During the injection of steam into the formation 41, the organic liquid being displaced radially from the well 11 will become very diluted by the fluids in the exterior portions of the formation. In this manner, the transition zone 48, which was created by the organic liquid, will eventually dissipate because of the diluting effect of the steam and the oil in the formation 41. The miscible displacement of any oil in the formation 41 ceases when the transition zone 48 dissipates and the steam spreads rapidly downstream of where the transition zone 48 last existed.

The solution introduced into the formation 41 may include varying amounts of the cationic surfactant in the organic liquid. However, it has been found that good results are obtained when the cationic surfactant is used in an amount from .001 to 50 volume percent of the organic liquid. However, in the usual situation, between 1 and 5 volume percent of the cationic surfactant is present in the organic liquid.

The solution may be used in a slug of any size which is of sufficient volume to cover the treated area 47 of the formation 41 surrounding the well 11. No fixed rule can be given on the amount of the slug volume since the characteristics of the formation 41, including its pore volume and connate liquid contents, cause this volume to vary. However, for general purposes, the solution may be injected as a slug into the formation 41 in an amount from .5 to 20 gallons per exposed foot of formation 41 measured along the well 11. The larger slug volume usually treats the formation 41 to a distance of about 5 feet from the well 11.

The nonionic surfactant may be used in any suitable amount to reduce the formation of water-in-oil emulsions. For example, between .001 and 50 volume percent of the nonionic surfactant can be employed on the basis of the above mentioned solution volume. However, regulated amounts of the nonionic surfactant may also be metered directly into the steam passing through the manifold line 22. Thus, a sufficient quantity of the nonionic surfactant is provided with the steam in the formation 41 to resolve water-in-oil emulsions.

The amounts of the nonionic surfactant can be determined experimentally by knowledge of the quantity of steam that is injected into the formation 41. For example, the greater the quantity of steam, obviously the greater the quantity of the nonionic surfactant that is required to retard forming water-in-oil emulsions within the formation 41. These quantities may be determined empirically on a basis of the steam to be injected. However, the quantity of the nonionic surfactant may also be determined experimentally from steam stimulating tests in core samples or in the formation 41, with selected additions of the nonionic surfactant until the water-in-oil emulsions are reduced to a minimum in the produced fluid.

In some instances, as for example where the formation 41 about the well 11 is highly fractured, or the reduction in fluid permeability due to fresh-water swelling of the clay materials can be tolerated, the solution may omit the cationic surfactant of the quaternary amine type and contain only the organic liquid and the nonionic surfactant. By this arrangement, the advantages of the organic liquid and a nonionic surfactant in providing increased steam injectivity by reduced formation of water-in-oil emulsions in the formation 41 may be realized. However, for best results, the solution could contain the organic liquid, the cationic surfactant, and the nonionic surfactant.

ORGANIC LIQUID

Any organic liquid having mutual solubility for oil and water may be used in the present method. A liquid of this type is able to remove water and oil blocks from the formation 41. Thus, water is removed from clay materials which were previously swollen by the presence of fresh water. In this manner, the clay materials return to their normal size by action of the organic liquid. As a result, the permeability to fluids of the formation is increased. Further, the organic liquid removes oil and organic deposits from about the well 11. As a result, the immediate generation of emulsions from these materials adjacent the well 11 is avoided. It can be seen from the foregoing that the organic liquid places the formation 41 into the best physical condition for steam stimulation by the present method.

By the organic liquid having mutual solubility for oil and water is meant one or more organic compounds containing both a hydrocarbon group and a polar group in the same molecule.

A system of classifying organic compounds based upon solubility in various liquids has been developed. This classification has been described, for example, by Shriner and Fuson in The Systematic Identification of Organic Compounds, 8th edition, John Wiley & Sons, Inc. (1940). One class of compounds described by these authors is identified by them as class $S_1$. In this class are the compounds which are soluble in water and in ether. Solubility in benzene can be substituted for solubility in ether. A compound is regarded as being soluble if 0.2 cubic centimeter of the solute will dissolve in 3 cubic centimeters of the solvent at room temperature. Compounds in this class $S_1$ can be employed in the practice of the present method as the organic liquid having mutual solubility for oil and water.

Particular compounds, singly and in admixture, which are useful include: methyl, ethyl, propyl, isopropyl, n-butyl, isobutyl, tertiary butyl, 2-pentyl, tertiary amyl, dichloro tertiary butyl, and allyl alcohols; ethylene propylene, diethylene, butyl, tetraethylene, dipropylene, and tripropylene glycols; dioxane; dimethyl sulfoxide; ethylene glycol monomethyl, ethylene glycol monoethyl (generally termed ethyl Cellosolve), ethylene glycol monopropyl, ethylene glycol monobutyl (generally termed butyl Cellosolve), ethylene glycol monophenyl, propylene glycol methyl, diethylene glycol monoethyl, diethylene glycol n-butyl, dipropylene glycol monomethyl, tripropylene glycol monomethyl, ethylene glycol dimethyl, diethylene glycol dimethyl, triethylene glycol dimethyl, and tetraethylene glycol dimethyl ethers; glycerol triacetate; methyl acetate; methyl acetoacetate; acetone; methyl ethyl ketone; trichloro acetaldehyde (chloral); pyridine; and acrylaldehyde (acrolein). Of these organic liquids, it is preferred to employ ethylene glycol monobutyl ether (butyl Cellosolve) for best results. However, either ethylene glycol monomethyl ether, ethylene glycol monoethyl ether, tertiary butyl alcohol, or diethylene glycol monoethyl ether can be used to good advantage in the present method.

A single organic liquid having mutual solubility for oil and water may be preferred in some uses. However, mixtures of these liquids having mutual solubility for oil and water may be employed with equal effect and result to the single organic liquid. A mixture of these liquids has particular use where a single liquid, because of economic considerations or otherwise, is desirable for use but its solubility for water is not as high as might be desired. In such cases, the addition of another organic liquid having a higher solubility for water will provide a mixture having a more desirable solubility for water. With such mixtures, a smaller quantity of organic liquid will be capable of treating a given volume of the formation 41 around the well 11. A preferred mixture of these liquids is one containing ethylene glycol, monobutyl ether and ethylene glycol monoethyl ether.

CATIONIC SURFACTANTS OF THE QUATERNARY AMINE TYPE

Any cationic surfactant of the quaternary amine type may be used in the present method. These surfactants have an organic group in the molecule which tends to pass to the cathode, or negatively charged pole, during electrolysis. For example, cetyl trimethyl ammonium bromide is such a surfactant. These surfactants are all amines in which the ammonium group is relatively strongly basic. Therefore, these amines form, upon neutralization with an acidic molecule, a resultant salt that is water soluble. These surfactants show varying degrees of surface-active properties. Since these surfactants are water soluble, they tend to form water-in-oil emulsions.

In one preferred embodiment of the present method, the polyethoxylated coconut acid residue-quaternary ammonium chloride salts, as set forth below, are useful:

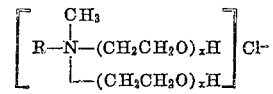

wherein R is a coconut acid residue consisting of $C_{10}$, $C_{12}$ and $C_{14}$ mixed aliphatic groups and $x$ is the total mole ratio of polyoxyethylene to R in the molecule.

A specific example of these salts is designated by the trade name Ethoquad C/25 which has a 25:1 mole ratio of polyoxyethylene to coconut acid residue (R) as aliphatic groups in the above formula.

The cationic surfactants of the quaternary amine type also have the property of ion replaceability with the active centers on the clay materials found in the formation 41. The ion exchange produces a stable ammonium form of the clay material which becomes oil-wet. For example, the ammonium-bentone form of sodium bentonite results from this ion exchange of a clay material. No fresh-water swelling can occur with the clay material in an oil-wet state. Also, no significant amount of "free" surfactant is available to form oil-in-water emulsions in the formation 41.

Many cationic surfactants of the quaternary amine type are known to those skilled in the art. All of the surfactants appear to be usable in the present method. These surfactants are all amine derivatives of ammonia, such as amines, amides, and imidazolines. They may be oxyalkylated (ethylated, etc.) to control the exact degree of water solubility that may be desired.

These surfactants of the quaternary amine type may be generally characterized in groups of: (1) Quaternary Ammonium Salts, (2) Salts and Quaternary Derivatives of Amino Amides, (3) Salts and Quaternary Derivatives of Imidazolines, and (4) Salts and Quaternary Derivatives of Amino Esters. Surfactants from all the following groups 1–4 are useful in the present method.

GROUP 1.—QUATERNARY AMMONIUM SALTS

*Example: Hexadecyl dimethyl benzyl ammonium chloride*

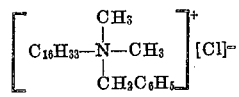

Surfactants in this group have a good solubility in water, and especially over a wide pH range. They have been used previously as germicides and sanitizers in aqueous fluids. Other surfactants of this group are set forth in the following listing:

Some of the useful surfactants in this group may be compounded with nonionic surfactants. However, the amounts of these other surfactants are so minute that the mixture is essentially, in composition and effect, only that of the surfactants of this group.

GROUP 2.—SALTS AND QUATERNARY DERIVATIVES OF AMINO AMIDES

*Examples: Monostearyl diethylene triamine dihydroacetate*

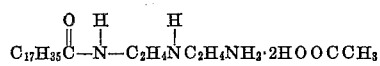

*and beta-diethyl aminoethylstearamide ethosulfate*

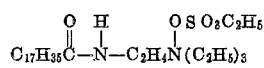

Compounds of this group are prepared by neutralization of the amino amides resulting from the interaction of fatty acids with polyamines. The quaternaries are formed by alkylation of the amino amides. This is a large group among all cationic surfactants. The quaternary listed above (second formula) is actually "Sapamine KW," the earliest and for a time the leading cationic agent. More complex compounds have been replacing it in recent years.

| Trade Name | Chemical Nature | Manufacturer |
|---|---|---|
| Arquads 12, 14, etc. | n-Alkyl trimethyl ammonium chlorides | Armour. |
| Arquad 2C, etc. | RR'—N—(CH$_3$)$_2$Cl | Do. |
| Bionol A-50 | Alkyl dimethyl benzyl ammonium chloride | Antara. |
| BTC | Alkyl dimethyl benzyl am. chloride | Onyx Oil. |
| Cetab | C$_{16}$H$_{33}$N(CH$_3$)$_3$Br | Fairfield Labs. |
| Cetol | Cetyl dimethyl benzyl am. chloride | Fine Organics. |
| Cronox 16-A | Lauryl dimethyl benzyl am. chloride | Atlas, Aquaness Dept. |
| Ethyl Decab | Octadecenyl-9, dimethyl ethyl ammoaium bromide | Fairfield Labs. |
| G-202 | N-alkyl morpholinium quaternary | Atlas. |
| Hyamine 3104 | Di-docenyl dimethyl am. chloride | Rohm & Haas. |
| Octab (and Decab) | Octadecyl dimethyl benzyl am. chloride | Fairfield Labs. |
| Quatronyx | Alkyldimethyl carboxymethyl am. chloride | Onyx Oil. |
| Triton X-400 | Stearyl dimethyl benzyl am. chloride | Rohm & Haas. |
| Zephiran | Alkyldimethyl benzyl am. chloride | Winthrop-Stearns. |

Lauryl pyridinium chloride, $C_5H_5N(C_{12}H_{25})Cl$, is an example of several useful pyridinium types.

Other surfactants of this group useful in the present method are set forth in the following listing:

| Trade Name | Chemical Nature | Manufacturer |
|---|---|---|
| Ahcovel A | Fatty carbamide (USP 2,304,113, etc.) | Arnold, Hoffman. |
| Appramine SN | Substituted fatty amide (USP 2,201,041) | Warwick Div. Sun. |
| Bickanol Softener AF Paste | Aliphatic aminoethylamide | Bick & Co. |
| Diaperm H | Amino fatty condensate with emulsifier | Quaker. |
| Drucomine A | Fatty quaternary ammonium salt | E. F. Drew. |
| Emulsept | CH$_3$(CH$_2$)$_n$COOC$_2$H$_4$NHCOCH$_2$N(C$_2$H$_5$)Cl | Emulsol. |
| Intracols R, O, OA | Fatty acid amides with multiple amino groups | Syn. Chem. |
| Lupomin | Alkyloamide | J. Wolfe Co. |
| Nopcogen 16-S | Aminoethyl ethanolamine stearamide | Nopco. |
| Perma-Par R | Acetate of substituted secondary amine | Refined Prod. |
| Sepamine MS | Quat. Amm. Cpd. (but not as a salt) | Ciba Co. |
| Sepamine KWC | Methosulfate (cf. Sapamine KW above) | Ciba. |

GROUP 3.—SALTS AND QUATERNARY DERIVATIVES OF IMIDAZOLINES

*Example: m-Heptadecyl, N-aminoethyl imidazoline hydroacetate*

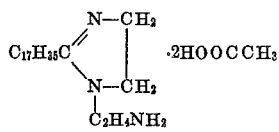

These surfactants are usually made by treating the imidazoline with an alkylating agent such as diethyl sulfate. Then, the imidazoline is condensed with ethylene oxide to form the alkyl, alkylated derivatives.

Other surfactants of this group useful in the present method are set forth in the following listing:

| Trade Name | Chemical Nature | Manufacturer |
|---|---|---|
| Amine 220 | 1-hydroxyethyl-2-heptadecenyl glyoxaldine | Carbide & Carbon. |
| Alro Amine O | (Same as Amine 220) | Geigy. |
| Alro Amine S | (Made from stearic instead of oleic acid as Amine O is made) | Do. |
| Antarox G-100 | Oxyethylated condensate of polyamines with sperm oil | Antara. |
| Katapol VP-532 | Salt of a polyethylene ether of a fatty amine (may contain sulfate link) | Do. |
| Miranol OH | Modified lauroyl imidazoline hydroxyacetate | Miranol Chem. |
| Onyxsan S, S-50 | Alkylimidazoline hydroacetates (see USP 2,200,815) | Onyx Oil. |

GROUP 4.—SALTS AND QUATERNARY DERIVATIVES OF AMINO ESTERS

*Typical formula*

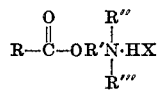

Relatively easy to make by esterification, these surfactants have been on the market every since ethanolamines became available.

Other surfactants of this group useful in the present method are set forth in the following listing:

| Trade Name | Chemical Nature | Manufacturer |
|---|---|---|
| Alkaterge C | Substituted oxazoline | Coml. Solvents. |
| Amine ES | Alkyl diethyl ethanolamine | Carbide & Carbon. |
| Avitex R | Alkyl tertiary amine ester salt | DuPont. |
| Emulphor FM | Oleyltriethanolamine | (German). |
| Negamine | Hydroxyamino fatty ester | Syn. Chemicals. |
| Lupomin | Alkyl olamide | J. Wolfe & Co. |
| Sapamine WL | Alkyl tertiary amine condensate | Ciba. |

NONIONIC SURFACTANTS

There are many known nonionic surfactants which can be used as demulsifiers for water-in-oil emulsions. Many of these surfactants are in everyday use in above-surface facilities. These surfactants resolve such emulsions into a crude oil phase which is freed of water to a sufficient degree to permit its sale commercially. The surfactants of this type are predominantly esters, ethers, or ether-esters. The surfactant molecule has an oil-soluble group usually derived from natural oils and fats, or natural and synthesized hydrocarbons.

The nonionic surfactants are made water soluble by the presence in the molecule of a highly water-soluble group, such as a polyhydric alcohol. However, the water-solubilizing group may be provided by a large number of ether-oxygen linkages (such as the alkylene oxide adducts). Thus, the miscibility in water of the surfactant may be easily obtained and controlled in the desired degree by the presence of the water-solubilizing group.

The general formula:

$$R-COO(CH_2CH_2O)_xCH_2CH_2OH$$

represents the typical surfactant of the polyoxyethylene fatty acid ester type.

In one preferred embodiment of the present method, the polyethoxylated nonyl phenols are useful. More particularly, the nonyl phenol which is molecularly adducted with 8.5 moles of ethylene oxide and designated by the trade name Igepal CO-630 may be used in the method.

As mentioned, the water-soluble nonionic surfactants tend to produce oil-in-water emulsions. Thus, if these surfactants are added to a water-in-oil emulsion in an amount to counter the effect of the emulsifier in the emulsion, the emulsion will be resolved into separate oil and water phases.

The water-soluble surfactants may be characterized into the following groups: (1) simple oil-soluble esters, (2) polyoxyalkylene esters and ethers, and (3) fatty acid-alkanolamine condensates.

GROUP 1.—SIMPLE OIL-SOLUBLE ESTERS

The surfactants of this group may be described as the reaction products of organic acids and materials such as alcohols and glycols which contain a hydroxyl group. Surfactants of this group useful in the present method are set forth in the following listing:

| Trade Name | Chemical Nature | Manufacturer |
|---|---|---|
| Alcolec | Lecithin | Am. Lecithin. |
| Aldo 25 | Propylene glycol monostearate | Glyco Products. |
| Arlacel Series | Sorbitan fatty acid esters | Atlas. |
| Atmuls | Mono- and di-glycerides of fat-forming fatty acids | Do. |
| Atpet 100 | Sorbitan monooleate | Do. |
| Emcol 14 | Polyglyceride ester of a fatty acid | Emulsol. |
| NNO | Glycerol mannitan laurate | Atlas. |
| Spans | Sorbitan fatty acid esters | Do. |

GROUP 2.—POLYOXYALKYLENE ESTERS OF ETHERS

From fatty acids, alkyl phenols, fatty and synthetic alcohols and the alkylene oxides, it is possible to build an almost infinite number of surfactants, differing in various degrees of surface activity. Several thousand different surfactants have actually been developed. For example, the low-foaming household detergent, ALL, is based on oxyethylated tall oil plus inorganic builders.

| Trade Name | Chemical Nature | Manufacturer |
|---|---|---|
| Advawet 33 | Polyglycol ester | Advance Solvents. |
| Aquet (retail) | Alkyl aryl polyglycol ether | Emil Greiner. |
| Brij 30 and 35 | $C_{12}H_{25}O(C_2H_4O)_nCH_2CH_2OH$ | Atlas. |
| Cerfak 1300 and 1301 | $C_{12}H_{25}S(C_2H_4O)_nCH_2CH_2OH$ | Houghton. |
| Detergent CF-10 | Alkyl aryl polyglycol ether | Rohm & Haas. |
| Emulphor EL-620 | Castor oil plus 20 moles EtO | Antara. |
| Emulphor ON-870 | $C_{18}H_{35}O(C_2H_4O)_{22}CH_2CH_2OH$ | Do. |
| Energetic | Tall oil plus about 15 moles EtO | Armour. |
| Ethofats | Polyoxyethylated fatty acids | Do. |
| Ethomids | Polyoxyethylated fatty amides | Do. |
| Igepal CO-530 | 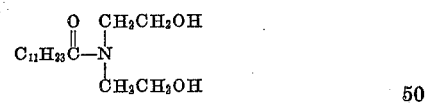 $-O(C_2H_4O)_4CH_2CH_2OH$ | Antara. |
| Igepal CO-630 | $C_9H_{19}-$ $-O(C_2H_4O)_{8.5}CH_2CH_2OH$ | Do. |
| Igepal CO-850 | Nonylphenol plus 20 moles EtO | Do. |
| G-3920 | Oleyl alcohol plus 20 moles EtO | Atlas. |
| G-3694 | Stearyl alcohol plus 4 moles EtO | Do. |
| G-3707 | Lauryl alcohol plus 7 moles EtO | Do. |
| Myrj 52 | Stearic acid plus 40 moles EtO | Do. |
| Myrj 45 | $C_{17}H_{35}COO(C_2H_4O)_7CH_2CH_2OH$ | Do. |
| Neutronyx 600 | (Same as Igepal CO-630) | Onyx. |
| Nonic 218 | Polyoxyethylene thioether | Sharples. |
| Nonisol 100 | Polyethylene glycol 400 monolaurate | Geigy. |
| Nonisol 200 | Polyethylene glycol 400 monooleate | Do. |
| Nonisol 210 | Polyethylene glycol 400 dioleate | Do. |
| OX-98 | Nonyl phenol plus 10 moles EtO | Atlas, Aquaness Dept. |
| OX-126 | Nonyl phenol plus 4 moles EtO | Do. |
| OX-128 | Nonyl phenol plus 6 moles EtO | Do. |
| OX-119 | Lauryl alcohol plus 23 moles EtO | Do. |

It can be seen that the water solubility of the surfactants in this group is readily controlled by the alkylene oxide chain length. Generally, water solubility of these surfactants increases with each increase in the alkylene oxide chain length.

GROUP 3.—FATTY ACID-ALKANOLAMINE CONDENSATES

These Kritschevsky-type surfactants have the following general structure:

$$C_{11}H_{23}\overset{O}{\overset{\|}{C}}-N\overset{CH_2CH_2OH}{\underset{CH_2CH_2OH}{}}$$

Actually, they are very complex mixtures of amides, fatty esters, amino esters and possibly even imidazoline compounds, and even Kritschevsky (U.S. Patent Nos. 2,089,212 and 2,094,608-9) was not able to identify the chemical structures involved in the formation of these apparently simple products. The basic process consists of heating a mole of fatty acid with two moles of diethanolamine in an open kettle for a few hours; nothing more. There are, of course, many variations of both method and raw materials, and firms such as Procter and Gamble make huge quantities for use as foam stabilizers in liquid detergent composition.

Other surfactants of this group useful in the present method are set forth in the following listing:

| Trade name: | Manufacturers |
|---|---|
| Alrosols | Geigy Chemical Co. |
| Cardene | Carlisle Chemical Works. |
| Detergent 80 | Peck's Products Co. |
| Emcol 5100, 5130, etc. | Emulsol Chemical Corp. |
| Hyonic FA-20, FS, etc. | Nopco Chemical Co. |
| Ninols | Ninol Laboratories, Inc. |
| Nopcogens | Nopco Chemical Co. |
| Onyx-ols | Onyx Oil & Chemical Co. |
| Solar "CO" liquid | Swift & Co. |

From the foregoing, it will be apparent that herein has been described a method well suited to improve the recovery of oil by steam stimulation techniques. Various changes may be made in the steps of the present method without departing from the spirit of this invention; and these changes are intended to come within the scope of the appended claims.

What is claimed is:
1. A method for recovering oil from an oil-bearing formation containing fresh-water swelling clay materials, and oil forming water-in-oil emulsions in the presence of steam, said formation penetrated by well means adapted for conveying fluids between the earth's surface and the formation, comprising the steps of:
   (a) injecting a single-phase solution as a slug into said formation from said well means, said solution consisting essentially of an organic liquid having mutual solubility for oil and water, and a cationic surfactant of the quaternary amine type;
   (b) injecting steam from said well means into said formation receiving said solution until said formation adjacent said well means is heated sufficiently to reduce the viscosity of the oil contained therein; and
   (c) recovering the oil of reduced viscosity from said heated formation via said well means.

2. The method of claim 1 wherein said organic liquid is butyl Cellosolve.

3. The method of claim 1 wherein said solution consists essentially of butyl Cellosolve and from .001 to 50 volume percent of said cationic surfactant.

4. The method of claim 3 wherein said solution is injected as a slug into said formation in an amount from .5 to 20 gallons per foot of formation measured along said well means.

5. A method for recovering oil from an oil-bearing formation containing fresh-water swelling clay materials, and oil forming water-in-oil emulsions in the presence of steam, said formation penetrated by well means adapted for conveying fluids between the earth's surface and the formation, comprising the steps of:
   (a) injecting a single-phase solution as a slug into said formation from said well means, said solution consisting essentially of an organic liquid having mutual solubility for oil and water, a cationic surfactant of the quaternary amine type and a water-soluble nonionic surfactant;

(b) injecting steam from said well means into said formation receiving said solution until said formation adjacent said well means is heated sufficiently to reduce the viscosity of the oil contained therein; and (c) recovering the oil of reduced viscosity from said heated formation via said well means.

6. The method of claim 5 wherein said organic liquid is butyl Cellosolve.

7. The method of claim 5 wherein said solution consists essentially of butyl Cellosolve and a total surfactant content from .001 to 50 volume percent of said cationic surfactant and said nonionic surfactant.

8. The method of claim 7 wherein said solution is injected as a slug into said formation in an amount from .5 to 20 gallons per foot of formation measured along said well means.

9. A method for recovering oil from an oil-bearing formation containing fresh-water swelling clay materials, and oil forming water-in-oil emulsions in the presence of steam, said formation penerated by well means adapted for conveying fluids between the earth's surface and the formation, comprising the steps of:

(a) injecting a single-phase solution as a slug into said formation from said well means, said solution consisting essentially of an organic liquid having mutual solubility for oil and water, and a cationic surfactant of the quaternary amine type;

(b) injecting steam from said well means into said formation receiving said solution until said formation adjacent said well means is heated sufficiently to reduce the viscosity of the oil contained therein;

(c) adding to said injected steam a water-soluble nonionic surfactant to reduce the emulsification of oil with said steam in said formation; and (d) recovering the oil of reduced viscosity from said heated formation via said well means.

10. The method of claim 9 wherein said organic liquid is butyl Cellosolve.

11. The method of claim 9 wherein said solution consists essentially of butyl Cellosolve and a total surfactant content from .001 to 50 volume percent of said cationic surfactant and said nonionic surfactant.

12. The method of claim 11 wherein said solution is injected as a slug into said formation in an amount from .5 to 20 gallons per foot of formation measured along said well means.

13. A method for recovering oil from an oil-bearing formation containing fresh-water swelling clay materials, and oil forming water-in-oil emulsions in the presence of steam, said formation penetrated by well means adapted for conveying fluids between the earth's surface and the formation, comprising the steps of:

(a) injecting a single-phase solution into said formation from said well means, said solution consisting essentially of an organic liquid, a cationic surfactant of the quaternary amine type, and a water-soluble nonionic surfactant;

(b) injecting steam from said well means to carry said solution into the formation and until said formation adjacent said well means is heated sufficiently to reduce the viscosity of the oil contained therein; and (c) recovering the oil of reduced viscosity from said heated formation via said well means.

14. The method of claim 13 wherein said organic liquid is butyl Cellosolve, said cationic surfactant is a polyethoxylated coconut acid residue-quaternary ammonium salt and said nonionic surfactant is a polyethoxylated nonyl phenol.

References Cited

UNITED STATES PATENTS

| | | | |
|---|---|---|---|
| 3,131,759 | 5/1964 | Slusser et al. | 166—2 |
| 3,204,694 | 9/1965 | Johnson et al. | 166—40 X |
| 3,292,702 | 12/1966 | Boberg | 166—40 |
| 3,330,344 | 7/1967 | Reisberg | 166—9 |
| 3,366,174 | 1/1968 | Ferrell et al. | 166—9 |
| 3,373,809 | 3/1968 | Cooke | 166—9 |
| 3,379,249 | 4/1968 | Gilchrist et al. | 166—40 X |
| 3,389,750 | 6/1968 | Bohor et al. | 166—9 |
| 3,396,792 | 8/1968 | Muggee | 166—40 |
| 3,402,770 | 9/1968 | Messenger | 166—40 |

STEPHEN J. NOVOSAD, *Primary Examiner.*

U.S. Cl. X.R.

166—274